United States Patent
Kundu et al.

(10) Patent No.: US 10,225,148 B2
(45) Date of Patent: Mar. 5, 2019

(54) SOCIAL NETWORK OF VIRTUAL MACHINES

(71) Applicant: International Business Machines Corporation, Armonk, NY (US)

(72) Inventors: Ashish Kundu, New York, NY (US); Ajay Mohindra, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 457 days.

(21) Appl. No.: 14/862,205

(22) Filed: Sep. 23, 2015

(65) Prior Publication Data

US 2017/0085421 A1 Mar. 23, 2017

(51) Int. Cl.
*H04L 12/24* (2006.01)

(52) U.S. Cl.
CPC ........ *H04L 41/083* (2013.01); *H04L 41/0816* (2013.01); *H04L 41/5077* (2013.01)

(58) Field of Classification Search
CPC ............... H04L 41/083; H04L 41/0816; H04L 41/5077
See application file for complete search history.

(56) References Cited

U.S. PATENT DOCUMENTS

| | | | |
|---|---|---|---|
| 8,214,838 B2 | 7/2012 | Cherkasova et al. | |
| 8,331,267 B2 | 12/2012 | Zhang et al. | |
| 8,418,185 B2 | 4/2013 | Durham et al. | |
| 9,489,230 B1* | 11/2016 | Patwardhan | .......... G06F 9/4856 |
| 9,529,621 B2 | 12/2016 | Richards et al. | |
| 9,794,139 B2* | 10/2017 | Bragstad | ................. H04L 43/04 |
| 9,887,951 B2* | 2/2018 | Soundararajan | ........ H04L 51/32 |
| 2008/0163239 A1* | 7/2008 | Sugumar | ............... G06F 9/5088 718/105 |
| 2010/0332889 A1* | 12/2010 | Shneorson | ............. G06Q 10/04 714/2 |
| 2011/0029672 A1 | 2/2011 | Agneeswaran | |
| 2011/0035802 A1* | 2/2011 | Arajujo, Jr. | ........... G06F 11/079 726/23 |
| 2012/0117226 A1* | 5/2012 | Tanaka | ................ H04L 41/0266 709/224 |
| 2013/0055241 A1 | 2/2013 | De et al. | |
| 2013/0060839 A1 | 3/2013 | Van Biljon et al. | |
| 2013/0205042 A1 | 8/2013 | Cohn | |
| 2013/0290957 A1 | 10/2013 | Li et al. | |
| 2013/0346518 A1 | 12/2013 | Soundararajan et al. | |
| 2013/0346519 A1* | 12/2013 | Soundararajan | ....... G06Q 10/06 709/206 |
| 2014/0089510 A1 | 3/2014 | Hao et al. | |

(Continued)

OTHER PUBLICATIONS

Kokkinos et al., "Social-like Analysis on Virtual Machine Communication Traces", 2012 IEEE 1st International Conference on Cloud Networking (CLOUDNET), 978-1-4673-2798-5/12/ © 2012 IEEE, pp. 75-79.

(Continued)

*Primary Examiner* — Oanh Duong
(74) *Attorney, Agent, or Firm* — Edward J. Wixted, III

(57) ABSTRACT

Virtual machines (VMs) and a social networking graph where relationships between VM nodes are based on communications between VM nodes. VMs using social networking graphs to help manage a set of VMs. A system where a VM uses a social networking graph to query other VMs to query regarding "health" issues, problem solutions and/or performance improvements.

6 Claims, 3 Drawing Sheets

(56) References Cited

U.S. PATENT DOCUMENTS

| | | | |
|---|---|---|---|
| 2014/0115582 A1 | 4/2014 | Katiyar | |
| 2014/0115583 A1 | 4/2014 | Lee et al. | |
| 2014/0365522 A1* | 12/2014 | Soundararajan | G06F 17/30587 707/770 |
| 2014/0365531 A1* | 12/2014 | Soundararajan | G06F 17/30587 707/798 |
| 2014/0372788 A1* | 12/2014 | Vavrick | G06F 11/0793 714/4.1 |
| 2015/0081521 A1 | 3/2015 | Leighton et al. | |
| 2015/0154046 A1* | 6/2015 | Farkas | G06F 9/485 718/1 |
| 2015/0256483 A1* | 9/2015 | Bragstad | H04L 43/04 709/219 |
| 2016/0127509 A1* | 5/2016 | Uriel | H04L 61/103 709/203 |
| 2016/0256783 A1 | 9/2016 | Shedletsky, III | |

OTHER PUBLICATIONS

Manzalini et al., "Clouds of Virtual Machines in Edge Networks", IEEE Communications Magazine • Jul. 2013, pp. 63-70.

Soundararajan et al., "A Social Media Approach to Virtualization Management", VMware Technical Journal Winter 2012, 25 pages, <https://labs.vmware.com/vmtj/a-social-media-approach-to-virtualization-management>.

Williams, Alex, How Machines Will Use Social Networks to Gain Identity, Develop Relationships and Make Friends, Posted Sep. 1, 2012, 7 pages, <http://techcrunch.com/2012/09/01/how-machines-will-use-social-networks-to-gain-identity-develop-relationships-and-make-friends/>.

"Easy tools make easy community", Open Source, Buddycloud, provided by inventor in post disclosure comments dated Jul. 17, 2013, last printed on Apr. 13, 2015 11:28 AM, <http://buddycloud.com/>, 5 pages.

"HugeDomains.com—SmartMediaCloud.com is for sale (Smart Media Cloud)", provided by inventor in post disclosure comments dated Jul. 17, 2013, 4 pages, <http://www.hugedomains.com/domain_profile.cfm?d=smartmediacloud&e=co m>.

"SmartCloud—System and Method for Faster VM Provisioning Time Utilizing Peers", An IP.com Prior Art Database Technical Disclosure, Authors et. al.: Disclosed Anonymously, IP.com No. IPCOM000221313D, IP.com Electronic Publication: Sep. 4, 2012, pp. 1-4.

* cited by examiner

= RELATION BASED ON COMMON HOST MACHINE

= RELATION BASED ON COMMUNICATION

RS410 = (COMMON HOST ADDER) + [(NUMBER OF COMM'NS) * (DATA VOL)]

RS412 = (NUMBER OF COMMUNICATIONS) * (DATA VOLUME)]

SOCIAL NETWORK OF VIRTUAL MACHINES

BACKGROUND

The present invention relates generally to the field of computer systems administration and management, and more particularly to administration and management of a plurality of virtual machines in a cloud environment.

The Wikipedia entry for "virtual machine" as of 29 May 2015 states as follows: "In computing, a virtual machine (VM) is an emulation of a particular computer system. Virtual machines operate based on the computer architecture and functions of a real or hypothetical computer, and their implementations may involve specialized hardware, software, or a combination of both."

The Wikipedia entry for "social network" as of 29 May 2015 states as follows: "A social network is a social structure made up of a set of social actors . . . and a set of the dyadic ties between these actors. The social network perspective provides a set of methods for analyzing the structure of whole social entities as well as a variety of theories explaining the patterns observed in these structures. The study of these structures uses social network analysis to identify local and global patterns, locate influential entities, and examine network dynamics."

SUMMARY

According to an aspect of the present invention, there is a method, computer program product and/or system that performs the following operations (not necessarily in the following order): (i) receiving a virtual machine (VM) social networking graph data set, with the VM social networking graph data set representing a VM social networking graph including a plurality of nodes respectively representing a plurality of VMs and a plurality of edges respectively representing relationships between the VMs of the plurality of VMs; (ii) performing, by machine logic, analytics on the VM social networking graph of the VM social networking graph data set to determine a first management action for managing a set of managed VM(s); and (iii) performing the first management action on the set of managed VM(s).

According to a further aspect of the present invention, there is a method, computer program product and/or system that performs the following operations (not necessarily in the following order): (i) receiving a virtual machine (VM) social networking graph data set, with the VM social networking graph data set representing a VM social networking graph including a plurality of nodes respectively representing a plurality of VMs and a plurality of edges respectively representing relationships between the VMs of the plurality of VMs, and with the plurality of VMs including a first VM and a second VM which is related to the first VM by an edge in the VM social networking graph; (ii) performing, by the first VM, a first corrective action to resolve an operational issue; (iii) storing, by the first VM, an identity of the first corrective action taken; (iv) querying, by the second VM, a set of queried VM(s) of the plurality of VMs with which the second VM is related to in the VM social networking graph, with the set of queried VM(s) including the first VM, to determine corrective action(s) taken by VM(s) of the set of queried VM(s); (v) responsive to the querying, receiving, from the first VM and by the second VM, the identity of the first corrective action; and (vi) performing, by the second VM, the first corrective action.

According to a further aspect of the present invention, there is a method, computer program product and/or system that performs the following operations (not necessarily in the following order): (i) receiving a virtual machine (VM) operational data set relating to the implementation and/or operations of a plurality of VMs; (ii) creating, by machine logic, a VM social networking graph data set based on the VM operational data set, with the VM social networking graph data set representing a VM social networking graph including a plurality of nodes respectively representing the plurality of VMs and a plurality of edges respectively representing relationships between the VMs of the plurality of VMs, wherein a first edge of the plurality of edges, relating a first node of the plurality of nodes and a second node of the plurality of nodes, is added to the VM social networking graph data set based upon information in the VM operational data set indicating that a first VM of the plurality of VMs represented by the first node and a second VM of the plurality of VMs had between them at least one communication.

DETAILED DESCRIPTION

Figure 1:
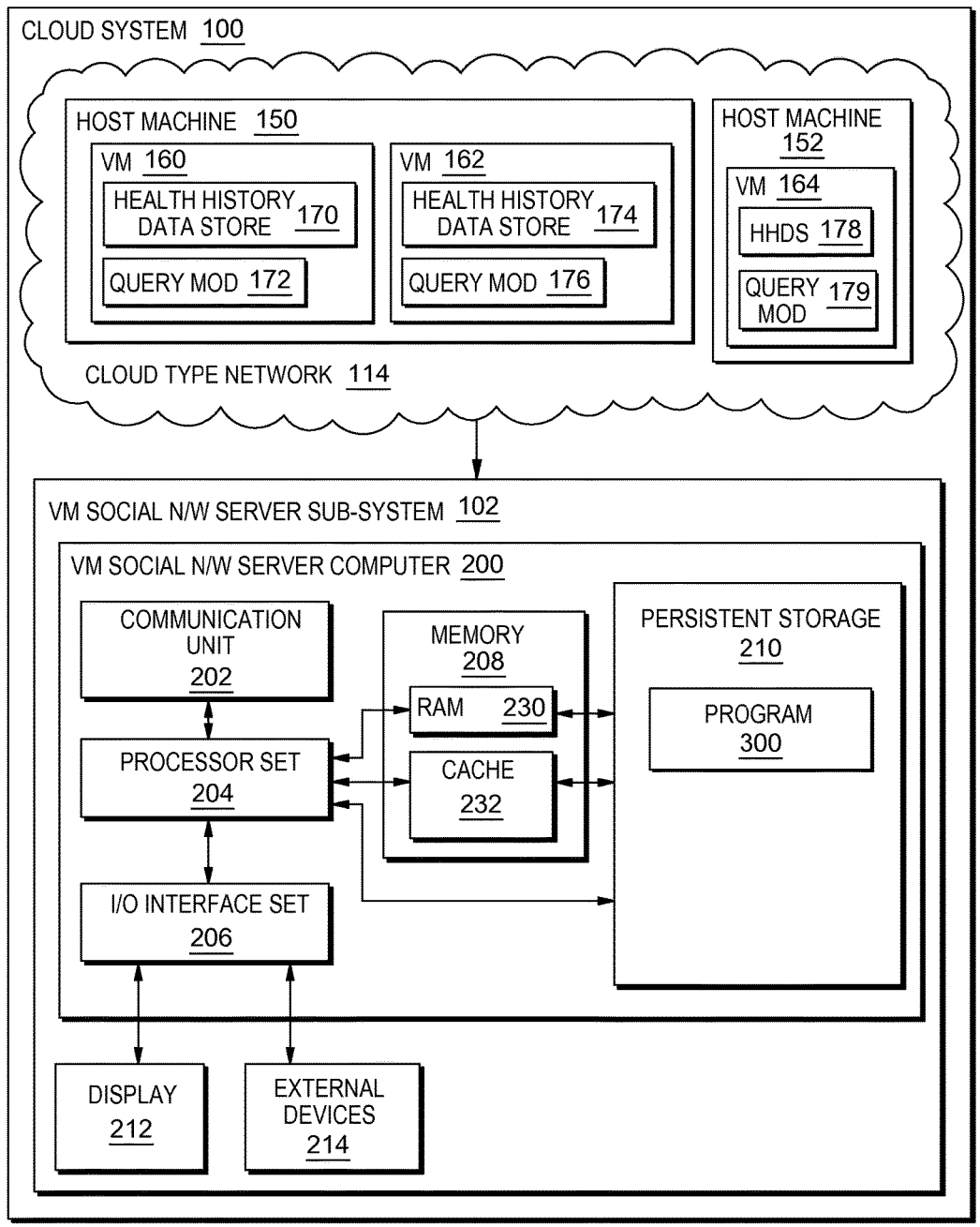
FIG. 1 is a block diagram view of a first embodiment of a system according to the present invention.

Some embodiments of the present invention are directed to virtual machines (VMs) and a social networking graph where relationships between VM nodes are based on communications between VM nodes. Some embodiments of the present invention are directed to VMs using social networking graphs to help manage a set of VMs. Some embodiments of the present invention are directed to a system where a VM uses a social networking graph to query other VMs regarding, "health" issues, performance problem solutions and/or performance improvements. This Detailed Description section is divided into the following sub-sections: (i) The Hardware and Software Environment; (ii) Example Embodiment; (iii) Further Comments and/or Embodiments; and (iv) Definitions.

I. THE HARDWARE AND SOFTWARE ENVIRONMENT

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to the Figures. FIG. 1 is a functional block diagram illustrating various portions of networked cloud system 100, including: cloud type network 114; host machines 150 and 152; virtual machines (VMs) 160, 162, and 164; health history data stores, 170, 174 and 178; query modules 172, 176, and 179; VM social network server sub-system 102; VM social network server computer 200; communication unit 202; processor set 204; input/output (I/O) interface set 206; memory device 208; persistent storage device 210; display device 212; external device set 214; random access memory (RAM) devices 230; cache memory device 232; and program 300.

VM social network server sub-system 102 is, in many respects, representative of the various computer sub-system(s) in the present invention. Accordingly, several portions of VM social network server sub-system 102 will now be discussed in the following paragraphs.

VM social network server sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage and control certain software functions that will be discussed in detail, below, in the Example Embodiment sub-section of this Detailed Description section.

VM social network server sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

VM social network server sub-system 102 is shown as a block diagram with many double arrows. These double arrows (no separate reference numerals) represent a communications fabric, which provides communications between various components of VM social network server sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for VM social network server sub-system 102; and/or (ii) devices external to VM social network server sub-system 102 may be able to provide memory for VM social network server sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to VM social network server sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. EXAMPLE EMBODIMENT

Figure 2:
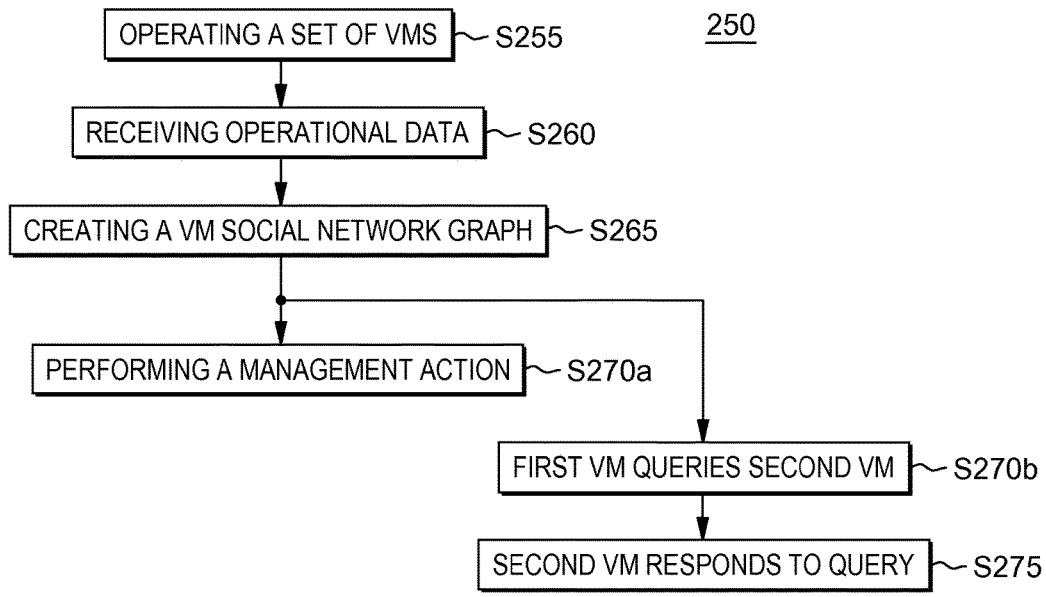
FIG. 2 is a flowchart showing a first embodiment method performed, at least in part, by the first embodiment system.
Figure 3:
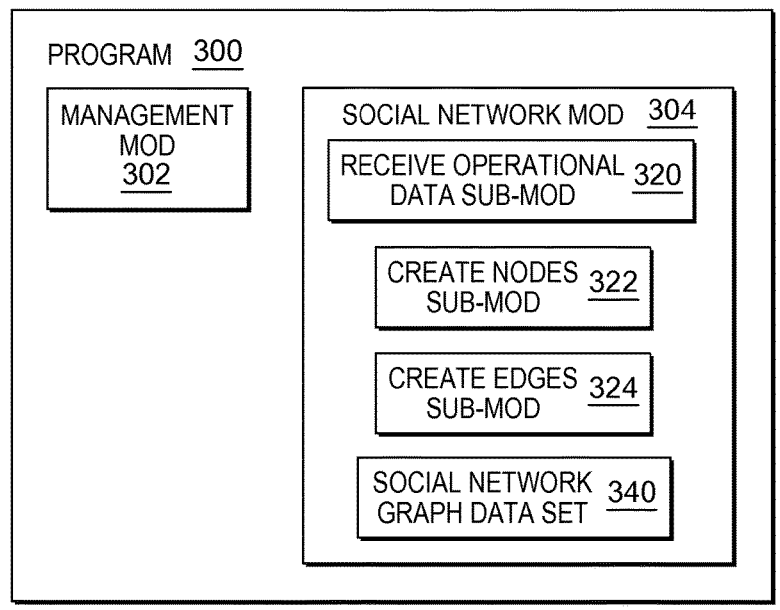
FIG. 3 is a block diagram showing a machine logic (for example, software) portion of the first embodiment system.

FIG. 2 shows flowchart 250 depicting a method according to the present invention. FIG. 3 shows program 300 for performing at least some of the method operations of flowchart 250. This method and associated software will now be discussed, over the course of the following paragraphs, with extensive reference to FIG. 2 (for the method operation blocks) and FIG. 3 (for the software blocks).

Processing begins at operation S255, where management module ("mod") 302 of program 300 operates a set of virtual machines (VMs) 160, 162, 164 (see FIG. 1). In this example, the set of virtual machines corresponds to the set of VMs implemented by an enterprise. The operation of the VMs at operation S255 corresponds to currently conventional management and operations of a set of VMs and will, therefore, not be discussed in detail herein.

Processing proceeds to operation S260, where receive operational data sub-mod 320 of social network module 304 receives operational data pertaining to the operational performance of set of VMs 160, 162, 164. In this example, this operational performance data, collected by sub-mod 320 includes: (i) data relating to exceptionally fast performance; (ii) data relating to exceptionally slow performance; (iii) presence of malware or the like; (iv) crashes or the like; (v) low available memory conditions; (vi) identity of the host machine 150, 152 hosting a given VM 160, 162, 164 at a given time; (vii) communication of data (one way or two way) between VMs of the set of VMs; (viii) low disk conditions; (ix) denial of service attacks; and/or (x) list of vulnerabilities and applied patches.

Processing proceeds to operation S265, where social network module 304 creates and stores VM social network graph 400 (see FIG. 4) for a set of VMs 160, 162, 164. Once created, the human readable social network graph 400 (see FIG. 4) is represented by machine readable social network graph data set 340 of social network mod 304. Social network graph 400, and corresponding social network graph data set 340, will generally change and evolve over time and continuing VM interactions.

More specifically, when creating the VM social network graph at operation S265, the machine logic of create nodes sub-mod 322 creates nodes as follows: (i) VM 160 is represented as node 402 (see FIG. 4); (ii) VM 162 is represented as node 404; and (iii) VM 164 is represented as node 406. In this example, there is one node for each VM in the set of VMs. Alternatively, some embodiments may allow (or even require) that multiple VMs can be grouped together in a single node.

Figure 4:
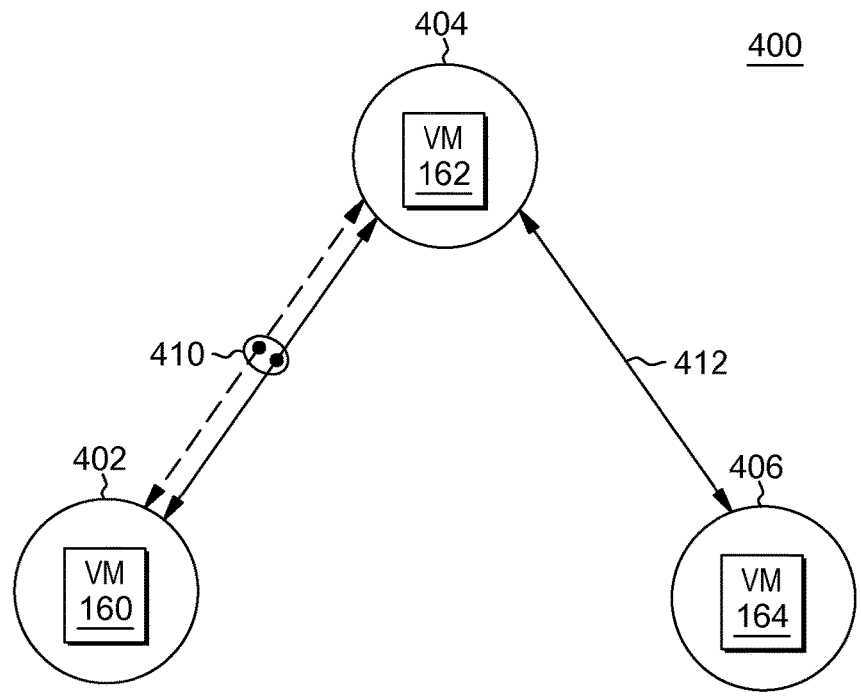
FIG. 4 is a social networking graph according to a first embodiment of a system according to the present invention.
Figure 4:
Figure 4:

When further creating the VM social network graph at operation S265, the machine logic of create edges sub-mod 324 creates edges as follows: (i) edge 410 (see FIG. 4) is created between node 402 and node 404; (ii) edge 412 (see FIG. 4) is created between node 404 and node 406; and (iii) no edge is created between node 402 and 406 in this simple example. In this example, the rule for creating an edge is as follows: an edge between nodes is created only if one of the following two conditions apply: (i) the VMs represented by two nodes have communicated data between them (in this embodiment the data communication may be one way or two way); and/or (ii) the VMs have, at least at some point, been hosted by the same physical machine. In the example of FIG. 4: (i) the edge between nodes 402 (corresponding to VM 160) and node 404 (corresponding to VM 162) is created on the basis of both data communication between VMs 160 and 162 and on the fact that they are both hosted on physical host machine 150 (see FIG. 1); (ii) the edge between nodes 404 (corresponding to VM 162) and node 406 (corresponding to VM 164) is created on the basis of data communication between VMs 162 and 164; and (iii) there is no edge between nodes 402 and 406 because the corresponding VMs have never communicated nor shared a host machine.

As mentioned above, in this embodiment, edge creation is based only upon communications between VMs and/or common hosting physical hardware. Alternatively, or additionally, other factors for establishing edges in VM social network graphs may include: VMs sharing a common ancestor in terms of virtual image template or operating system version; VMs that are part of the same solution topology.

In this embodiment, create edges sub-mod 324 assigns each created edge a relationship strength value. In this example, the relationship strength is calculated based on the following formula: (data volume of communication between two nodes)×(number of communication sessions between two nodes)+(adder value, A, if the two nodes have even been hosted on a common physical host machine. FIG. 4 shows how this formula for relationship strength value is applied to relationship edge 410 (that is, RS410) and relationship edge 412 (that is, RS412). Alternatively, other types of relationship strength values are possible, such as relationship strength defined as a weighting factor. As a further alternative, other factors may be used in calculating relationship strength values, such as two VMs that: (i) use the same parent virtual image or operating system version; (ii) are interdependent; and/or (iii) are part of the same solution.

Processing proceeds to operation S270a and to operation S270b, which will be respectively described in the following two paragraphs.

When processing proceeds to operation S270a, the machine logic of management mod 302 performs a management action on one or more VMs of the set of VMs based on VM social network graph 400 (which is reflected in machine readable VM social networking graph data set 340). In this example embodiment, the management action is the moving of VM 164 from host machine 152 (see FIG. 1) to host machine 150 because social network graph 400 indicates that: (i) VM 164 has a relationship with VM 162, which is hosted on host machine 150; and (ii) VM has no relationships with any other VMs on host machine 152. Alternatively, other possible management actions, based on the VM social networking graph include: (i) remediation wherein a VM queries other VMs in its social network about known vulnerabilities and initiates application of fixes; (ii) tuning of a target subsystem (such as a network, disk, cpu, or an application program) by querying its neighbors based on a supported solution; (iii) proactively informing a VM's social network about configuration changes that may be of interest to its neighbors; and/or (iv) increase the network stack buffers.

When processing proceeds to operation S270b, query mod 172 of VM 160 queries query mod 176 of VM 162. This querying is based, at least in part, upon VM social networking graph 400. More specifically, VM 160 has an "operational issue" (that is, an issue relating to operational efficiency, security, processing bottlenecks, storage availability, network performance, VM health, VM performance, patches, malware, crashing, etc.), so it consults VM social networking graph data set 340 to determine, by machine logic of query mod 172, that its strongest relationship (indeed its only network relationship) is with VM 162. Therefore, in this example, VM 160 queries VM 162 to determine a "corrective action" based on information from health history data store 174 of VM 162.

Processing proceeds to operation S275, where query mod 176 of VM 162 responds to the query by sending a response to query mod 172 of VM 160. In this example, the response includes all of the information from health history data store 174 of VM 162, including the identity of a "corrective action" in the form of an important patch that VM 160 has not had installed on itself. Alternatively, other types of corrective actions may include: (i) changing network configuration; (ii) deleting temporary files to free disk storage; (iii) terminating an offending process; (iv) restarting a service; and/or (v) downloading and applying a patch for a software product.

III. FURTHER COMMENTS AND/OR EMBODIMENTS

Some embodiments of the present invention may include one, or more, of the following features, characteristics and/or advantages: (i) virtual machines (sometimes referred to herein as VMs or computing systems) are organized as part of a social network (in a social networking construct); (ii) aspects of the social networking construct include modes of communication, access, and management of VMs in the cloud; (iii) VMs communicate with each other according to their solution or configuration; (iv) VMs communicate with cloud/solution administrators in both push and pull manners; (v) VMs remember the actions carried out on them; (vi) VMs remember issues they encountered and what was done to resolve each issue in an effective manner; and/or (vii) VMs that are "friend's" with other VMs query each other about their status, applied patches, and methods by which problems were resolved.

In some embodiments of the present invention, social networking mechanisms facilitate VM administration in ways that include: (i) providing access to VM consoles; (ii) communicating with VMs individually; (iii) communicating with VMs as a broadcast; (iv) communicating with VMs over a network infrastructure; (v) communicating with VMs as a multicast; (vi) simultaneously configuring multiple VMs using broadcast and/or multicast capabilities of a chat window; (vii) prioritizing VMs; (viii) organizing a solution by creating hierarchies of groups of VMs; and/or (ix) associating policies with VMs.

Some embodiments of the present invention may further include one, or more, of the following features, characteristics and/or advantages: (i) VMs use social networking to build a peer-to-peer overlay network; (ii) VMs learn from each other about their health, status, security vulnerabilities, etc.; (iii) VMs monitor each other, and if a VM does not respond to inquiries, then its status can be reported to a service function; (iv) a session initiation protocol (SIP)—based user agent runs on each VM (for example, a first VM can inform a second VM as to the patches that have been applied recently on the first VM, for example, to handle a security vulnerability); (v) a VM can check "availability" of another VM; (vi) an administrator can create groups on a conventional, open source multiplatform voice (VoIP), videoconferencing and instant messaging application (hereinafter referred to as a "VoIP client"), each group of VMs representing, for example, a project; (vii) when text messages are sent to a VM, the VM keeps track of the messages received and associated metadata; (viii) a message can be a natural language expression (for example, a human-readable text message) or a shell command—depending on the VM type; (ix) a VM, after receiving a command, processes the command and returns an output; and/or (x) a VM keeps a database of the commands/expressions received, associated meta-data and the details of its outputs.

An administrator can double click on a VM name on a VoIP client contact list to open a secure shell virtual network computing (SSH VNC) access on the VM. The administrator can select a mode of operation (conversational, programmatic) for the VM. A shell, specific to the mode of operation, loads.

A conversational mode uses a subset of English/conversational language to communicate. For example: "How loaded are you? Are you able to talk to other VMs?"

A programmatic mode loads, for example, a "bash" shell at the chat window. Commands are passed as messages. The messages received at the other end are then processed as commands.

Some embodiments of the present invention may include one, or more, of the following features, characteristics and/or advantages: (i) manages respective states and configurations of VMs on a cloud; (ii) updates software installed on VMs; (iii) manages security fixes and vulnerabilities; (iv) performs network management; (v) accesses VMs for the solution and administration; (vi) communicates with the VMs; and/or (vii) uses social networking as a primary mode of communication, access, and management of VMs in a cloud environment.

In some embodiments of the present invention, a cloud is treated as a social network of virtual machines. A social network graph of the cloud is created with the following attributes: (i) nodes in the social network graph are VMs in the cloud; (ii) edges between nodes in the social network graph are created if two VMs communicate with each other; (iii) weights on the edges of the social network graph are assigned based on amount of communication between the nodes; and/or (iv) the social network graph is dynamically updated as VMs are provisioned and/or de-provisioned.

Based on the social network graph of virtual machines, the following properties are computed:

(1) Betweenness Centrality—Quantifies the number of times node i acts as a bridge along the shortest path between two other nodes.

$$C_B(i) = \sum_{j<k} \frac{g_{jk}(i)}{g_{jk}}$$

Where:
$C_B(i)$=Betweenness centrality of node i
$g_{jk}$=number of shortest paths connecting nodes j and k
$g_{jk}(i)$=number of shortest paths connecting nodes j and k that include node i (2) Cliques—An undirected graph G=(V, E) is a subset of the vertex set C⊆V, such that for every two vertices in C, there exists an edge connecting the two.

(3) Community—A network is said to have community structure if the nodes of the network can be easily grouped into (potentially overlapping) sets of nodes such that each set of nodes is densely connected internally.

In some embodiments of the present invention, algorithms from social network theory are used to compute the social networking properties listed above. The Social network properties are used to perform system administration operations such as: (i) high availability—nodes are assigned high availability support based on their betweenness centrality (high to low) because a node with the highest centrality needs the maximum software and/or hardware support, as its failure could result in the solution being unavailable; (ii) patching—the clique construct is used to identify VMs belonging to a single solution, and patching decisions are made by the system administrator; (iii) access control—the community construct is used to make security decisions as VMs in the community belong to a single solution, and any breaching of a community structure could indicate a security breach; (iv) policy management—policies can be assigned; and/or (v) health status: VMs learn from each other about their health, status, security vulnerabilities, etc., from the community to which they belong. For example, a first VM can inform a second VM about the patches that have recently been applied on the first VM to handle a security vulnerability within the community.

Some embodiments of the present invention may include one, or more, of the following features, characteristics and/or advantages: (i) reduce system administration cost by differentiating VMs based on their social network properties; and/or (ii) increase security of the cloud virtual machines by continuously monitoring the social network.

Some embodiments of the present invention may include one, or more, of the following features, characteristics and/or advantages: (i) create a social network for VMs in a cloud environment; (ii) reduce system administration costs; (iii) differentiate VMs based on their social network properties; (iv) increase security of the cloud VMs by continuously monitoring the social network; (v) create a data structure wherein nodes in the social network are virtual machines in the cloud; (vi) create edges between two nodes if the nodes communicate with each other; (vii) assign weights to the edges of the network based on amount of communication between nodes; (viii) compute key attributes of the social network; (ix) perform system administration functions on the VMs in the network; (x) have a communication (graph) builder that establishes connections and strength of connection between one or more pairs of computing systems; (xi) have a set of policies (and/or rules) that use one or more of the attributes of two or more of the computing systems that have a connection with a strength of connection above a threshold; (xii) determine the availability, latency, patching or health or security status of one or more of the computing systems by applying one or more of the policies to one or more of the pairs of computing systems communicating with a strength above the threshold; (xiii) uses social network properties to perform system administration operations; (xiv) assigns high availability support based on a node's "betweenness" centrality (a node with the highest centrality needs the maximum support as a failure of its software and/or hardware could result in a solution being unavailable; (xv) uses a clique construct to identify VMs belonging to a single solution to facilitate patching decisions made by a system administrator; (xvi) uses a community construct to make security decisions as VMs in a community belong to a single solution and consequently any breach of a community structure could indicate a security breach; (xvii) assign and manage policies; and/or (xviii) VMs learn from each other about their health, status, security vulnerabilities, etc., from the community to which they belong (for example, a VM can inform another VM about patches that have been recently applied on it to handle a security vulnerability within the community.

Some embodiments of the present invention may include one, or more, of the following features, characteristics and/or advantages: (i) VMs remember the actions carried out on them, the issues they had and what was done to resolve those issues; (ii) VMs can query "friend" VMs about the "friends'" status, patches applied and how some problems were resolved (that is VMs learn from "friend" VMs and administration processes); (iii) the VMs in item (ii) above can (a) apply learned actions if they have identical issues, (b) suggest actions as learned from friend VMs, post the suggested actions to system administration, and wait for administration to approve the suggested actions or to provide updated actions (that is, perform an analytics driven actions process) if they have similar (but not identical) issues, as the friend VMs; (iv) analyze properties of the social network graph to determine which VMs are central to the social network of a solution, which VMs communicate with each other more than others, and which VMs communicate with each other (that is perform analytics of graph properties on a VM network); (v) use properties to patch, and manage the VMs appropriately (that is, using graph properties to manage the solution and its VMs); and/or (vi) include in the network graph a direct edge from one VM to another VM.

Some embodiments of the present invention may include one, or more, of the following features, characteristics and/or advantages: (i) the social network includes VMs, administrators and other entities; (ii) the social network is represented by a multi-graph type of social network graph in which multiple edges exist from one VM (or other type of node) to another VM (or other type of node); (iii) edges are defined statically or dynamically by a policy; and/or (iv) analytics are carried out using graphs and multi-graphs.

Further with reference to item (ii) in the paragraph above, some of the multiple edges represent, for example: (i) aspects of VM-to-VM communications; (ii) aspects of a session logged into one VM from another VM; (iii) VMs that inherit the same virtual image or virtual image template; and/or (iv) VMs that use the same operating system.

Some embodiments of the present invention involve technologies including: (i) session initiation protocol (such as OpenSIPS); (ii) a proxy server and network protocol for delivering audio and video over IP networks (such as RTPProxy); (iii) LSPF; (iv) Presence; (v) XML data management server (such as XDMS); (vi) database server; (vii) Polycom Solution; (viii) web application server; (ix) business intelligence and performance management products (such as COGNOS); (x) a transaction server; and/or (xi) FoodFOAK Solution.

(Note: the term(s) "OpenSIPS", "RTPProxy", "LSPF", "Presence", "XDMS", "Polycom", "Polycom Solution", and/or "COGNOS" may be subject to trademark rights in various jurisdictions throughout the world and are used here only in reference to the products or services properly denominated by the marks to the extent that such trademark rights may exist.)

IV. DEFINITIONS

Computing system: one or more of software components or software services in a networked system or VMs in a cloud.

Multicast: The Wikipedia entry for "multicast" (https://en.wikipedia.org/wiki/Multicast as of 15 May 2015) states as follows: "In computer networking, multicast (one-to-many or many-to-many distribution) is group communication where information is addressed to a group of destination computers simultaneously. Multicast should not be confused with physical layer point-to-multipoint communication." (Footnotes removed).

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

Target system: includes, but is not necessarily limited to, a computer system, a network, a storage device, and an application.

What is claimed is:

1. A method comprising:
   receiving a virtual machine (VM) social networking graph data set, with the VM social networking graph data set representing a VM social networking graph including a plurality of nodes respectively representing a plurality of VMs and a plurality of edges respectively representing relationships between the VMs of the plurality of VMs, and with the plurality of VMs including a first VM and a second VM which is related to the first VM by an edge in the VM social networking graph;
   performing, by the first VM, a first corrective action to resolve an operational issue;
   storing, by the first VM, an identity of the first corrective action taken;
   querying, by the second VM, a set of queried VM(s) of the plurality of VMs with which the second VM is related to in the VM social networking graph, with the set of queried VM(s) including the first VM, to determine corrective action(s) taken by VM(s) of the set of queried VM(s);
   responsive to the querying, receiving, from the first VM and by the second VM, the identity of the first corrective action; and
   performing, by the second VM, the first corrective action.

2. The method of claim 1 further comprising:
   querying of the second VM, by the first VM, to identify a first performance issue adversely affecting performance of the second VM.

3. The method of claim 2 further comprising:
   identifying a second corrective action that was effective in the first VM for solving a prior performance issue in the first VM the prior performance issue similar to the first performance issue in the second VM;
   receiving, from the first VM and by the second VM, the identity of the second corrective action;
   sending the identity of the second corrective action to system administration;
   waiting for system administration to accept or reject the second corrective action; and
   on condition that system administration accepts the second corrective action, implementing, by the second VM, the second corrective action.

4. The method of claim 3 wherein the second corrective action is restart of a service.

5. The method of claim 1, further comprising:
   identifying a first corrective action that was effective in the first VM, for solving a first performance issue in the first VM, the first performance issue identical to a second performance issue in the second VM;
   receiving, from the first VM and by the second VM, the identity of the first corrective action; and
   implementing, by the second VM, the first corrective action.

6. The method of claim 5 wherein the first corrective action is one of the following types: acquisition of patch code, application of patch code, change operational mode and/or restarting.

* * * * *